Patented Oct. 8, 1929

1,730,879

UNITED STATES PATENT OFFICE

ALBERT K. EPSTEIN, OF CHICAGO, ILLINOIS, ASSIGNOR TO THE EMULSOL CORPORATION, OF CHICAGO, ILLINOIS, A CORPORATION OF ILLINOIS

EGG PRODUCT AND PROCESS FOR PRODUCING THE SAME

No Drawing.  Application filed December 24, 1926.  Serial No. 156,996.

My invention relates to egg products and process for producing the same, being directed more particularly to a new composition of matter in the form of an egg yolk product.

The present invention is directed more particularly to a method of treating egg yolk with a substantially neutral edible salt system so as to modify the physical consistency such as viscosity and mobility of the yolk product when frozen and thawed and also give other desirable qualities to the product.

In general my invention contemplates the treatment of commercial egg yolks with a substantially neutral edible salt system so that the product when frozen and thawed out is one which has a viscosity greater than the yolk product before freezing and less than the yolk product after freezing. For some purposes it is advisable to have a yolk product with a viscosity so that the yolk product should lend itself to proper emulsification with oils and fats. I have discovered that when I add a certain amount of neutral salt in sufficient quantity to produce the desired effect, the salt has a solvent action upon the albuminous material of the yolk substance and when the product is frozen and thawed the yolk mixture is smooth and has fluidity, and it acquires a greater viscosity than the fresh yolk before freezing. When the neutral salt system is added to the yolk substance and then the product frozen and thawed out the physical consistency of the yolk is altered and dispersion of the protein material is changed and a product of different physical properties is obtained.

If the amount of salt is too much then the albuminous material will become precipitated and the physical properties of the resultant product after freezing and thawing will be altered to such an extent that the resultant product will not have mobility. Preferably an amount of salt should be added to the yolk substance to produce a viscosity after freezing and thawing which shall be greater than fresh yolks and less than fresh yolks frozen and thawed. For example, I have found that in the average commercial yolk as ordinarily employed, as much as substantially 10% of a neutral salt system such as sodium chloride may be used without destroying or reducing the mobility of the product too much when frozen and thawed. When so treated and sufficiently frozen and then thawed the product will have a viscosity greater than unfrozen untreated yolk and a mobility greater than ordinary untreated yolks frozen and thawed.

In general my invention contemplates the treatment of commercial egg yolk with a substantially neutral edible salt system, so that the product when frozen and thawed out is one which possesses certain advantageous characteristics which lends itself to be used readily in connection with products with which it is to be combined, such as emulsification with oils and other ingredients.

Referring now more in detail to the method of treating the yolk, I preferably take a suitable quantity of commercial yolk which is produced by separating the yolk from the white and testing each one to see that it is good. The yolks are then mixed and although a small amount of the white adheres to the yolk this is not detrimental, although care should be exercised in the separation of the yolk and white so that not more than a small amount of the white is permitted to remain.

This yolk is then treated with a suitable substantially neutral edible salt system such as sodium chloride in sufficient quantity to produce the desired result when frozen and thawed. The proportion of salt should not be so high as to destroy the mobility of the final product after freezing and subsequent thawing, but sufficient to produce a product which shall have a viscosity greater than fresh yolks before freezing. In practice I have found the use of substantially two to eight per cent by weight of sodium chloride to give the most desirable results for some purposes. For instance. I take ninety-four pounds of yolk and mix with it in a suitable mixer six pounds of sodium chloride and then pour this mixture into suitable cans where it is frozen to a temperature below bacterial decomposition. By freezing I mean subjecting the salt treated yolk to temperatures at which ordinary untreated yolk is usually frozen and kept in the ordinary egg freezing plant and cold storage warehouse until ready for use.

The amount of salt to be used also varies with the amount of white in with the yolk; the more white adhering, the more salt is preferably used. In practice I have been freezing the product at a temperature of minus ten or twelve degrees Fahrenheit, which is a usual temperature in the ordinary egg freezing plant or cold storage warehouse, where egg yolk is frozen.

By an edible neutral salt system I mean a one component salt system having a substantially neutral reaction such as common table salt or sodium chloride, which is of an edible nature, or a two or more component system containing a mixture of two or more salts of an edible nature which give in combination a neutral reaction. I have found other neutral salt systems to be satisfactory, such as an alkaline sodium phosphate ($NA_2HPO_4.12H_2O$) treated with sufficient acid sodium phosphate ($NAH_2PO_4$) to give a substantially neutral phosphate mixture. Or tri-sodium citrate (which is slightly alkaline) treated with sufficient citric acid or some other edible acid to render the sodium citrate neutral.

I also find that I may use another substantially neutral edible salt system in the form of tri-sodium phosphate ($NA_3PO_4$) which is strongly alkaline, and treat it with sufficient phosphoric acid, which is strongly acid to give a substantially neutral phosphate salt system.

In the treatment of the commercial yolk I preferably combine it with a sufficient quantity or proportion of a suitable one of the desirable salt systems so that the product when frozen and thawed out is one which although permanently thickened to a viscosity substantially greater than that of the fresh yolk, has a viscosity not so high as to destroy its mobility, when frozen and thawed.

The salt system may be added to the yolk material either in a normal state or with water or other suitable wetting substance.

Although I have given several methods of treating the yolk, I contemplate employing other suitable salt systems than those given by way of illustration, and therefore I do not desire to be limited to the exact process and products described and neither to the quantities described, but aim to cover all that which comes within the spirit and scope of the appended claims.

What I claim as new and desire to secure by United States Letters Patent is:—

1. As a new article of manufacture, a frozen product including egg material consisting essentially of egg yolk combined with sodium chloride in a proportion sufficient to substantially modify the physical consistency to produce an ultimate product when frozen and thawed which is thickened to a viscosity greater than that of fresh yolks before freezing, but in a proportion small enough to retain some mobility of the ultimate product after freezing and thawing.

2. As a new article of manufacture, a frozen egg product including egg material consisting essentially of egg yolk combined with a proportion of more than 2 per cent by weight of a suitable substantially neutral water soluble edible salt system but in a proportion small enough to retain some mobility of the ultimate product after freezing and thawing.

3. As a new article of manufacture, a frozen egg product including egg material consisting essentially of egg yolk combined with a proportion of more than 2 per cent by weight of sodium chloride but in a proportion small enough to retain some mobility of the ultimate product after freezing and thawing.

4. A new article of manufacture comprising an egg yolk product including a mixture of egg material consisting essentially of egg yolk combined with substantially 8% of sodium chloride preliminarily frozen and thawed and in a mobile state possessing a viscosity greater than that of the said mixture before freezing.

5. A new article of manufacture comprising an egg product including a mixture of egg material consisting essentially of egg yolk combined with a proportion of sodium chloride in sufficient quantity to materially modify the consistency of the ultimate product, preliminarily frozen and thawed, the product being in a mobile state and possessing a viscosity greater than that of untreated yolk before freezing and a mobility substantially greater than that of untreated yolk when thawed after freezing.

6. A method for manufacturing a frozen egg product including treating egg yolk by making a mixture of egg yolk and substantially 8% by weight of sodium chloride and freezing the mixture to modify the physical characteristics of the product, when thawed, to produce a viscosity greater than untreated, unfrozen yolk and a mobility greater than untreated yolk when thawed after freezing.

7. A method for manufacturing a frozen egg product including treating egg yolk with an amount of sodium chloride above 2% but in a proportion small enough to retain some mobility of the frozen egg product after freezing and thawing and then freezing the mixture, to modify the physical characteristics of the product when thawed to produce a viscosity greater than untreated, unfrozen yolk and a mobility greater than untreated yolk when thawed after freezing.

8. A method for manufacturing a mobile egg yolk product including freezing egg yolk treated by adding an edible, water soluble, neutral salt system in a proportion of more than 2% by weight but in a proportion small enough to retain some mobility of the ultimate product, after the product has been frozen and thawed, and in which the product after freezing and thawing has a viscosity greater than that of untreated yolk before freezing and greater than that of untreated yolk to which the same said proportion of salt has been added but without freezing, and thawing the mixture.

9. A method for manufacturing a frozen egg product comprising treating egg yolk with a suitable amount of a neutral, water soluble salt system and subjecting the mixture to freezing temperature at which it is maintained until desired for use; sufficiently to modify the physical characteristics of the product, when thawed, to produce a viscosity greater than untreated, unfrozen yolks and a mobility greater than untreated yolks when thawed after freezing.

10. A method for manufacturing an egg product comprising treating yolk with a suitable amount of sodium chloride and freezing the mixture sufficiently to modify the physical characteristics of the product, when thawed, to produce a viscosity greater than that of untreated, unfrozen yolks and a mobility greater than that of untreated yolks when thawed after freezing.

In witness whereof, I hereunto subscribe my name this 18th day of December, 1926.

ALBERT K. EPSTEIN.